April 5, 1932.  A. DINA  1,852,450
ADJUSTABLE OPTICAL SYSTEM FOR PROJECTION MACHINES
Filed March 7, 1929  5 Sheets-Sheet 2
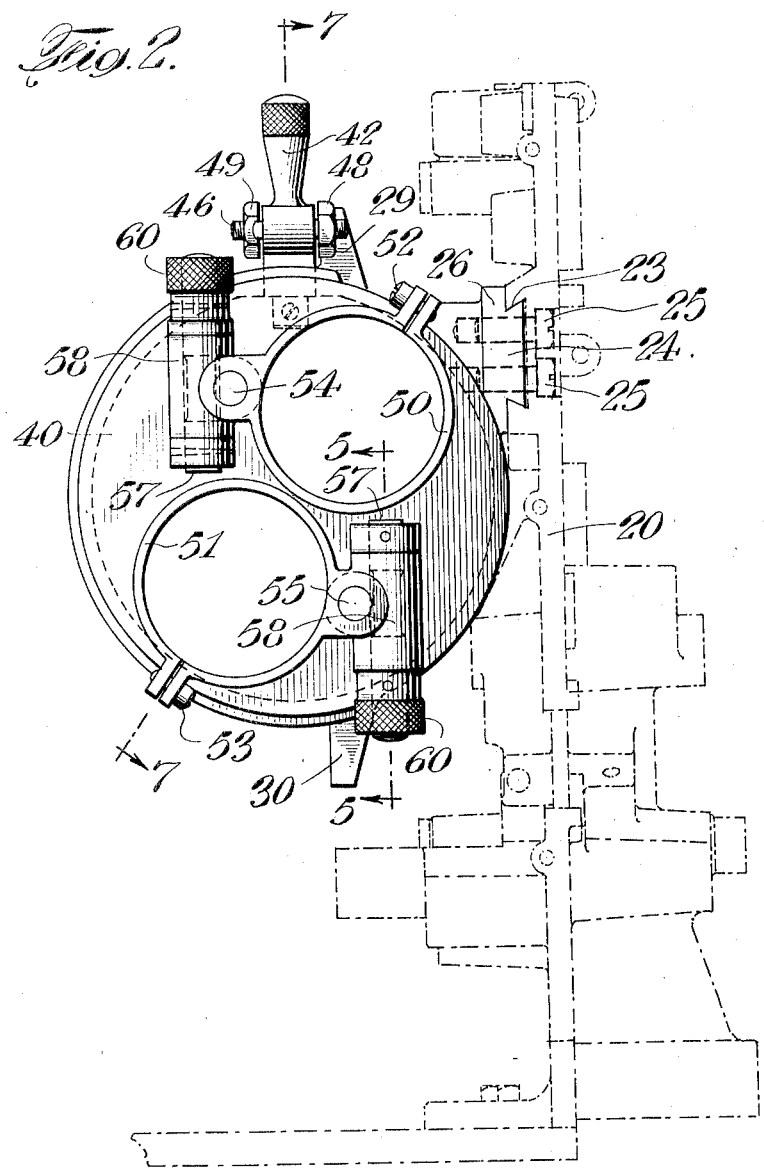
Inventor
Augusto Dina
By his Attorney
Howard W. Dix April 5, 1932. A. DINA 1,852,450
ADJUSTABLE OPTICAL SYSTEM FOR PROJECTION MACHINES
Filed March 7, 1929 5 Sheets-Sheet 3
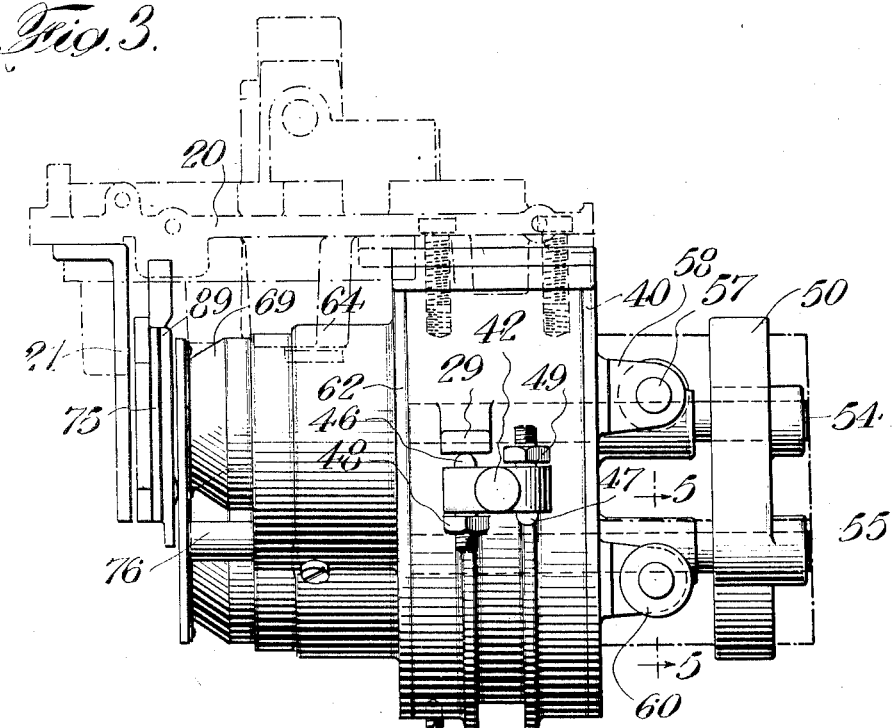
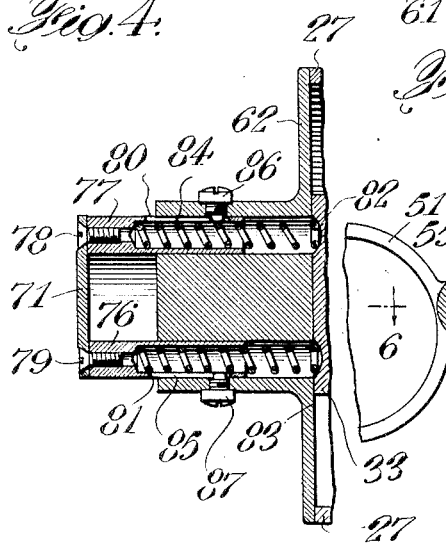
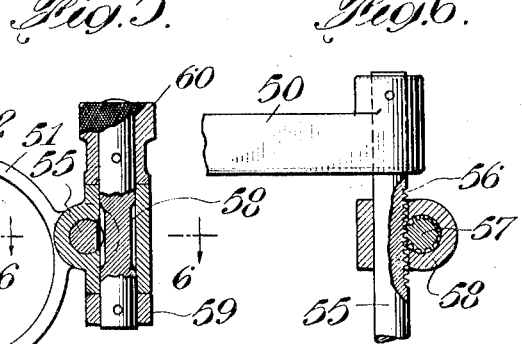
Inventor
Augusto Dina
By his Attorney
Howard W. Dix April 5, 1932.  A. DINA  1,852,450
ADJUSTABLE OPTICAL SYSTEM FOR PROJECTION MACHINES
Filed March 7, 1929  5 Sheets-Sheet 4
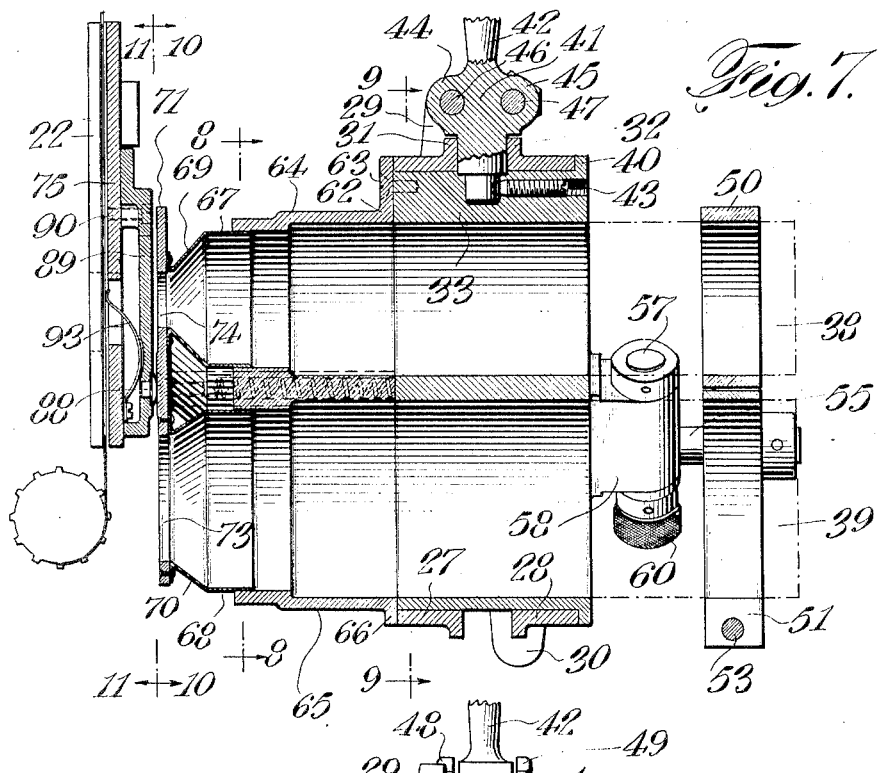
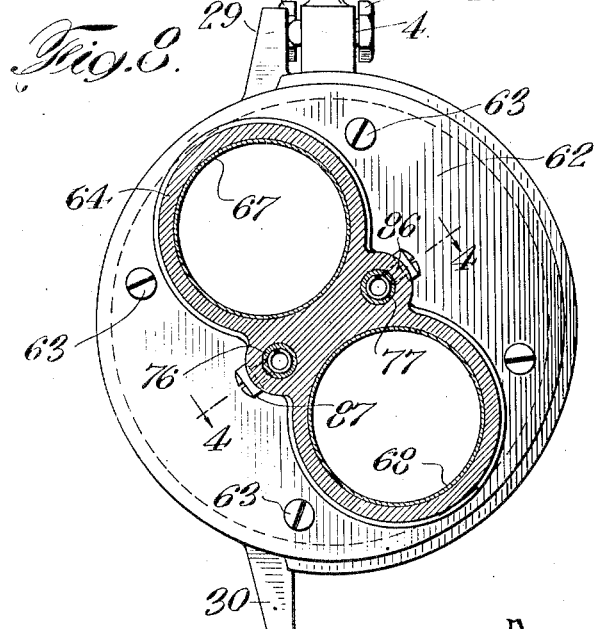
Inventor
Augusto Dina
By his Attorney

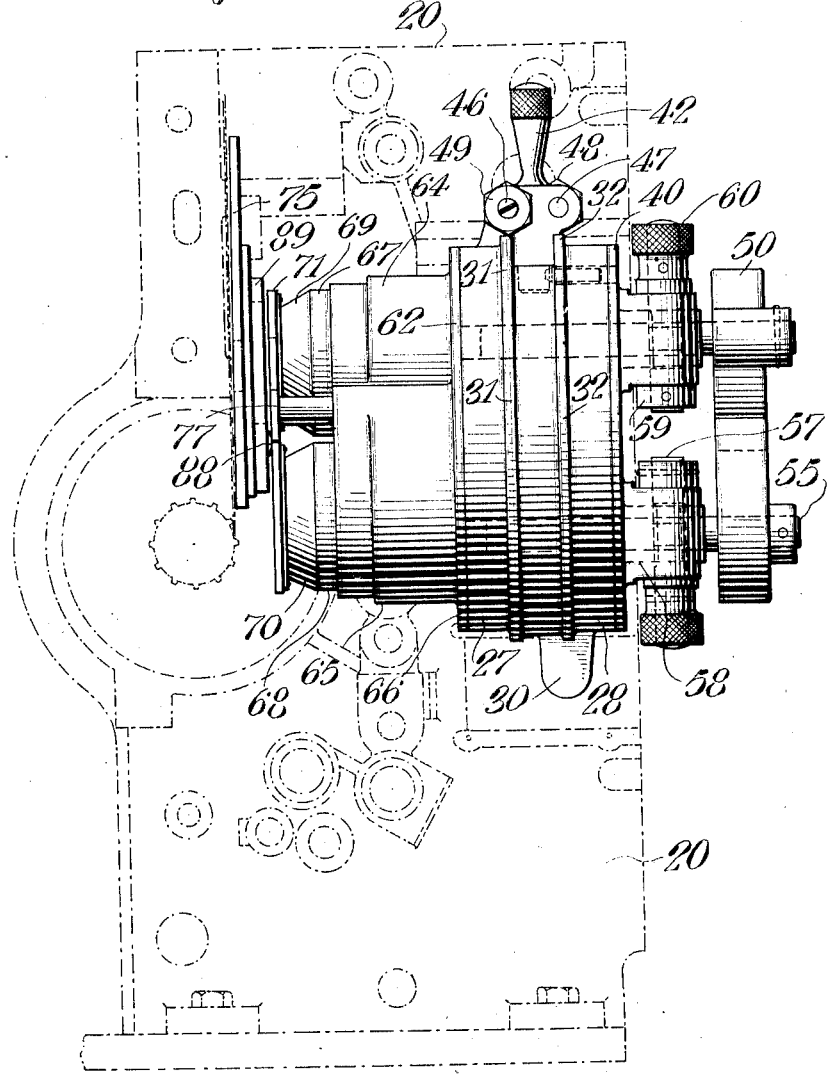

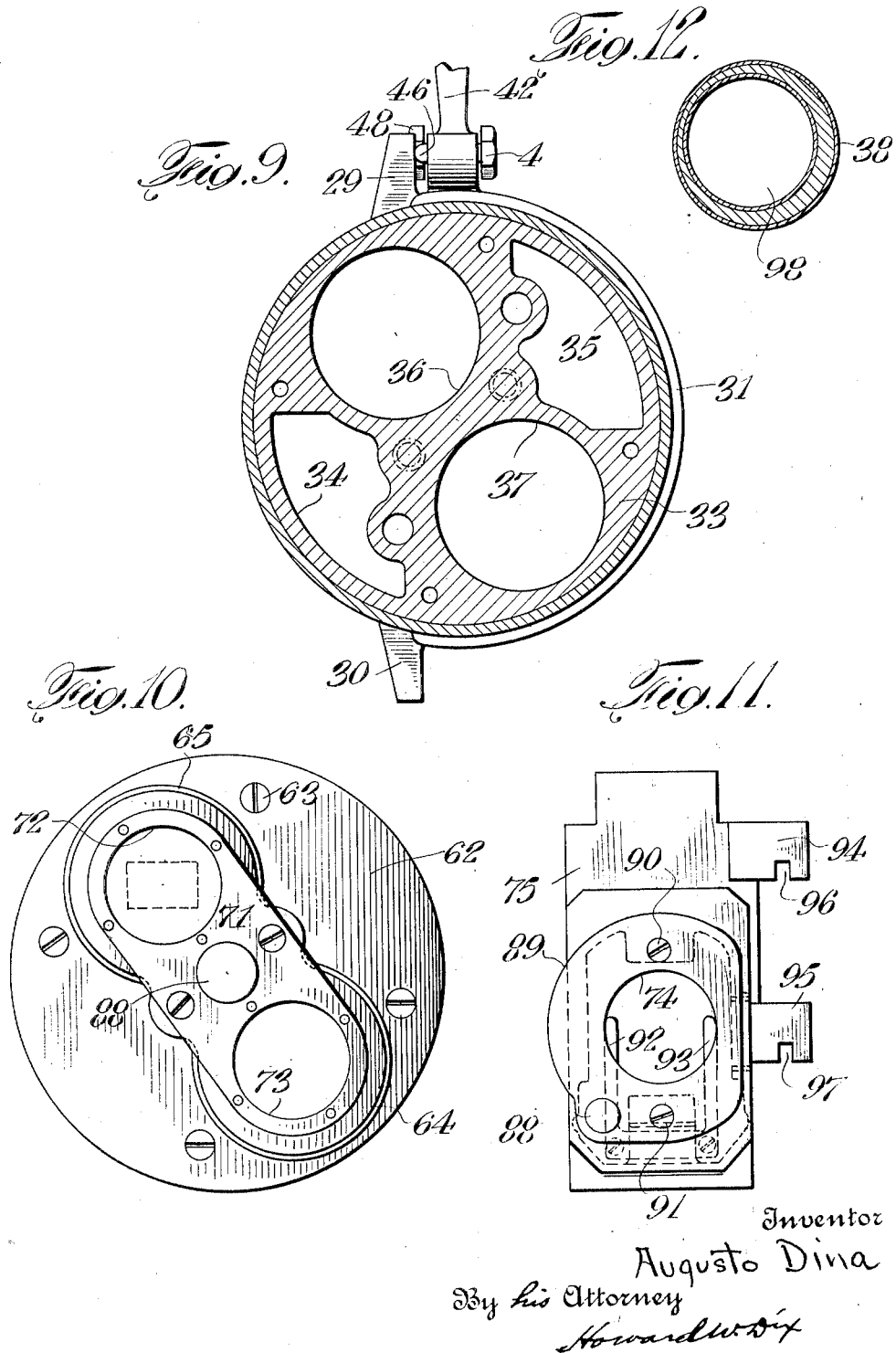

Patented Apr. 5, 1932

1,852,450

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

ADJUSTABLE OPTICAL SYSTEM FOR PROJECTION MACHINES

Application filed March 7, 1929. Serial No. 344,953.

This invention relates to projection machines and has particular reference to motion picture projectors including those intended for use with more than one type of film, as may be instanced by the ordinary type of film and by the film having one edge provided with the "talking strip".

In motion picture theatres of to-day, the screens may be about the same in size, but they do vary somewhat, however, and the distance from the operator's booth and the screen may vary widely. Furthermore, in the same theatre, and with the same projection machines, it may become necessary to project not only standard films but also "talkie" films. It will be apparent that if one projector is designed to be used with both types of film and also to different screen sizes and projection distances, it will be admirably suited to such theatres and have immense advantages over the ordinary types of projection machines. This necessitates that the machine be provided with lenses of different focal length and adjustable with respect to the optical axis of the machine whether it is the standard axis or a shifted axis occurring when the talkie films are used. An essential requirement in such a machine, however, should be that any change from one type of operation to another may be achieved with a minimum of time and without disturbing the alinement of the parts and the optical axis of the machine with respect to the film and the screen. Another requirement is that the parts be related in a simple but durable manner so that this quick operation may take place many times and over a long period of time without appreciable wear and tear and the necessity of loss of time for repair and readjustment. A further requirement is that the mechanism to permit shifting of the lenses be not bulky but compact and capable of fitting into the proper space without interfering with the usual construction of the standard machine and without increasing the fire risk.

The main object of this invention is to provide a simple, compact, rugged, device which is capable of being easily and quickly operated with a minimum of friction and loss of time on the part of the operator, to shift lenses to accommodate the projector to different screen sizes, distances, and different types of film.

A further object is to provide a device that will have the light beam enclosed to reduce the fire risk when the lens holding device is in any one of its allowable positions.

A still further object is to permit a very fine and accurate adjustment of the parts with respect to the film and the axis of the optical system and to achieve these adjustments without appreciable loss of time.

Further and more specific objects, features, and advantages will more clearly appear from the detailed description given below taken in connection with the accompanying drawings which form part of the specification and illustrate one embodiment of the invention, and in which:

Fig. 1 is a side elevation of the device applied to a projector head;

Fig. 2 is a front elevation of the device of Fig. 1 as viewed from the right;

Fig. 3 is a plan view of the device shown in Fig. 1;

Fig. 4 is a cross-section, taken on the line 4—4 of Fig. 8;

Fig. 5 is a cross-section, taken on the line 5—5 of Fig. 2;

Fig. 6 is a section taken on the line 6—6 of Fig. 5;

Fig. 7 is a cross-section taken on the line 7—7 of Fig. 2;

Fig. 8 is a cross-section taken on the line 8—8 of Fig. 7;

Fig. 9 is a cross-section taken on the line 9—9 of Fig. 7;

Fig. 10 is a cross-section taken on the line 10—10 of Fig. 7;

Fig. 11 is a view taken on the line 11—11 of Fig. 7; and

Fig. 12 is a partial section showing a modification of the device for mounting and adjusting the lenses.

The embodiment of the invention shown in the drawings is the present preferred form, and in it the projection head of the machine is provided with a vertical longitudinally extending wall 20 supporting the lens combinations, the shutter shaft and, as well, a transverse wall 21 which has the aperture plate mounted therein and is provided with the usual aperture opening 22 (see Fig. 3). One face of the wall 20 is provided with a slot 23 in which a tongue 24 is adapted to lie and is fastened therein by means of screws 25. This tongue is part of a head 26 which supports two rings 27 and 28 spaced apart, one of which has an upper abutment 30 thereon. Adjacent edges of the rings are provided with flanges 31 and 32.

A suitable lens-supporting means, here shown in the form of a barrel 33, fits smoothly within the rings 27 and 28 and are adapted to rotate therewithin. This barrel has cut-away portions 34 and 35 (see Fig. 9) to make it light weight, the cylindrical bores 36 and 37 extending entirely therethrough, and are carefully machined to receive the lens cylinders 38 and 39, clearly shown in Fig. 8. The barrel 33 is preferably flanged along one edge, as noted by the numeral 40, and this flange lies adjacent the right side of the ring 28 (see Fig. 7). This prevents lateral movement of the barrel 33 in one direction. Means for preventing its lateral movement in the opposite direction will be hereinafter described. The barrel 33 is operated by means of a head 41 suitably socketed in the barrel 33 and provided with a handle 42. A set screw 43 holds the head in position. The head 41 has lateral wings 44 and 45, the lower edges of which lie over and ride on the tops of the flanges 31 and 32 of the rings 27 and 28. Threadably mounted in the wings 44 and 45 are adjustment screws 46 and 47 which are provided with adjustment heads 48 and 49. The ends of the screws 46 and 47 are adapted to bear against the abutments 29 and 30, respectively, and permits a fine and accurate adjustment of the barrel, to thereby properly adjust the axis of the lens system with the center of the aperture opening.

The lens cylinders 38 and 39, which are so manufactured as to slide smoothly in the openings 36 and 37 of the barrel 33, are, at their outer ends, gripped by clamping collars 50 and 51, which are split and provided with clamping screws 52 and 53. These collars 50 and 51 are provided with bosses attached to stems 54 and 55. As shown in Figs. 5 and 6, the stem 55 is provided with teeth 56 engageable with teeth on a shaft 57 housed in a journal casing 58 attached to the face of the barrel 33. The lower end of the shaft 57 has a retaining collar 59 pinned thereto and the upper end has an operating knob 60 affixed thereto. The clamping collar 50 is mounted and operated in the same manner. When the knob is turned in one or the other direction, the lens cylinder is moved in or out of the barrel 33 and the lens thereby focused with great ease and accuracy.

At this point it is well to note that the cylindrical openings 36 and 37 in the barrel 33 are equidistant from the center of the barrel and that this center is the center around which the barrel is rotated. It is true, when one of the lens openings is moved to operative position, that the optical axis of the lens is in line with the center of the film aperture opening 22 previously mentioned as located in the wall 21. Any slight deviation of the axis from this center may be compensated for by the adjustment of the barrel through the screws 46 and 47 which act as micrometer adjustments of the barrel and therefore for the lenses. Thus, by a quick manipulation of the handle 42 a lens of the desired focal length may be quickly and accurately brought into alinement with the film aperture. The set screw 61 (see Fig. 3) can then be tightened to hold the barrel in this position until a further shift may be desirable.

Now turning to the other face of the barrel 33, it will be seen that it is closed by a plate 62 (see Figs. 1, 3 and 7) which is held in place by screws 63. Integral with the plate 62 is a pair of light-confining tubes 64 and 65 which axially are in perfect alinement with the axes of the cylindrical openings 36 and 37 in the barrel. The plate 62 is provided with the flange 66 which prevents lateral movement of the barrel in the rings 27 and 28.

In the outer ends of the tubes 64 and 65 are disposed slidable telescopic extensions thereof numbered 67 and 68, the outer ends of which are tapered in shape as numbered 69 and 70. The outer ends of these extension tubes are respectively fastened by rivets to a plate 71 which extends across between the two extensions and is provided with apertures 72 and 73 which are selectively registrable with the aperture 74 in the gate plate 75 and the film aperture opening 22. The rear face of the plate 71, near the center thereof, (see Figs. 4, 8 and 10) is provided with rearwardly extending sleeves 76 and 77 held thereagainst by screws 78 and 79. These sleeves 76 and 77 are preferably hollow to receive corresponding ends of springs 80 and 81, the other ends of which bear in tapered sockets 82 and 83 in the adjacent portion of the barrel 33 (see Fig. 4). On the outer surface of the sleeves 77 and 76 are slots 84 and 85 of predetermined length, into which the ends of set screws 86 and 87 extend to limit the inward and outward movement of the sleeves. The springs 80 and 81 therefore act to keep the plate 71 and the tubular extensions 67 and 68 always pushing outward toward the gate plate 75, and yet permitting the gate plate and/or the tubular extensions 67 and 68 to be pushed back away from the wall 21 containing the aperture opening 22 when it is desired to thread the film between the wall 21 and the gate plate 75.

Referring to Figs. 3, 7 and 10, it will be seen that the springs 80 and 81 tend always to press the plate 71 against the gate plate 75 and this plate is provided on the adjacent face with a stud or pin 88, the outer face of which is of a slightly convex curvature, and it is against this stud that the adjacent face of the plate 71 bears. This bearing provides the minimum of friction between the plate 71 and the gate plate when the barrel is being turned. The spacing between the plate 71 and the gate plate 75 is not more than about .003 inches, so that the slight gap thus formed will not be sufficient to permit any flame to escape if formed.

Referring now to Figs. 7 and 11, it will be observed that on the rear face of the gate plate 75 there is disposed a smaller cup-shaped plate 89 fastened to the rear of the gate plate 75 by means of screws 90 and 91. The aperture 74 previously mentioned is located in the cupped portion of this plate and is in perfect alinement with the film aperture opening 22 in the wall 21. It is this cup-shaped plate 89 which carries the stud pin 88 and within the cupped portion thereof are disposed two springs 92 and 93, the upper outer ends of which are adapted to extend through the opening in the gate plate and bear against the film. As shown in Fig. 11, this gate plate is provided with lateral hooked extensions 94 and 95 having slots 96 and 97 which engage a suitable gate carrier supported by a rod mounted in the machine whereby the gate plate may be moved back away from the wall 21 when it is desired to thread the film.

In Fig. 12 there is illustrated a modification designed to permit the use of the device with films which contain the "talkie strip." When such films are employed, one side of the film aperture is cut off by any suitable device and this naturally shifts the center of the modified aperture to one side of that of the standard opening. With the barrel 33 and the lenses therein, as above described, it will be observed that the optical axes of the lenses which in the positions above described, are alined for the standard openings and not for the modified openings employed with "talkies." Therefore, the modification permits the lens axes to be shifted to one side to bring the optical axis of each lens in alinement with the new center of the film aperture. This is effected as shown in Fig. 12, by mounting the lenses in casings, such as 98, which are eccentrically mounted in the cylinders 38 and 39 above mentioned, so that as each lens is brought into substantial alinement with the aperture opening by the rotation of the barrel 33, it can be separately and independently adjusted by reason of this eccentricity to realign its optical axis with the new center of the modified opening. The micrometer screws 48 and 49 can be operated to further this adjustment.

In accordance with the above detailed description of the apparatus, it will be observed that the operation of the device is as follows: Assuming that the parts are in the position shown in Fig. 2, the barrel 33 is in the position wherein the lens cylinder 38 is in alinement with the film aperture opening 22 and the opening 74 in the gate plate 75. The accuracy of this alinement is further ensured by the adjustment of the barrel by means of the micrometer screw 46 against the abutment 29. With the film in the machine and threaded down between the wall 20 and the plate 75, the projection light will pass through the film and thence into a completely closed passage until it leaves the projector and proceeds to the screen. This closed passage is formed by the telescopic extension 67, the tube 64, the barrel opening 36 and the lens casing 38. The fact that the telescopic extension 67 is held by the springs 80 and 81 closely against the rear of the gate plate 75 ensures the minimum gap consistent with frictionless rotation of the barrel 33 and substantial elimination of danger from flames. The engagement of the plate 71 with the stud 88 reduces the friction to a minimum.

With the lens casing 38 containing a lens of a certain focal length, this lens may be properly focused by means of the focusing screw 60 attached or associated with the lens engaging collar 50. If a modified film aperture is employed for talking pictures, then the lens in the casing 38 (as explained with respect to Fig. 12) may be moved eccentrically to bring its optical center in alinement with the new center of the aperture opening, together with further and additional adjustments of the screw 60 if necessary.

Supposing that the house in which the machine is to be used has a different screen size or a different projection distance, then it is obvious that a different lens must be employed in which the focal length of the new lens must conform to these new requirements. This is why the other lens casing 39 is provided, for in it is housed a lens of a different focal length and to bring this new lens into play it is only necessary to proceed as follows:

The set screw 61 is released, thus permitting the barrel 33 to rotate within the rings 27 and 28 by means of the handle 42 until the set screw 47 comes against the abutment 30 at the bottom of the ring 28. Then the lens casing is substantially in alinement with the aperture openings above mentioned and accurate adjustment therewith can be made by means of this set screw so that the newly positioned lens will be optically in perfect alinement. Then the set screw 61 is tightened and the barrel is locked in place until another change or shift is desired. If in this new position of the barrel, the talkie aperture is still in use the lens in the casing 39 may be separately adjusted as above described to aline it with the proper center of the modified aperture. Preferably, the lens is shifted to the center of the new size aperture opening by any suitable device such as shown herein, or as is disclosed in my Patent No. 1,773,573 issued August 19, 1930.

When it is desired to substitute one lens for the other, the dowser may be thrown to its closed position for less than a second. In fact a relatively slow passing of the dowser through the projection light beam would be sufficient to permit a substitution of the lens without notice. Another means for closing off the light rays during the substitution of the lenses, is to take advantage of one of the late types of aperture opening plates which are movable between the aperture opening and the film. The aperture plate may be constructed to have a non-punctured portion which may be passed momentarily to a position in front of the aperture opening.

All this time that the barrel has been in operation and is being shifted, the contact between the extensions 67 and 68 and the gate plate 75 have been maintained securely without any thought on the part of the operator. Even when he shifts the gate plate 75 to permit of threading of the film, it is not necessary for him to think about these extensions for their springs hold them firmly against the gate plate at all times altho permitting them to be pushed back therefrom when desired.

Thus in one simple, compact, and rugged device there is embodied the following advantages:—

A plurality of lenses may be mounted in a small rugged support or barrel which may be easily and quickly shifted to adapt one or another of the lenses to alinement with the optical system of the house whether standard or talking films are used and especially when the screen sizes and the projection distances may vary, or when it is desired to employ a screen area and at the same time maintaining the same length of light throw.

The apparatus takes up a minimum of space on the standard machine and at all times providing a substantially closed path for the projection light, thereby reducing fire hazards.

No matter what shifting is required, the parts in their adjusted positions may be accurately and rapidly alined with precision with respect to the proper optical axis.

The time required to make a complete shift and adjustment to either a variation in the screen size, projection distance, or modified film aperture, is exceptionally small and the operation may be accomplished hardly without notice.

While the invention has been describd in detail and with respect to a preferred form thereof, it is not desired that it be limited to such details or form since many modifications and changes may be made and the invention embodied in other forms without departing from the spirit and scope of the invention in its broader aspects. Hence it is desired to cover all modifications and forms coming within the language or scope of any one or more of the appended claims.

What is claimed, is,

1. In a projector, a plurality of lenses, a movable mount for said lenses, means supporting said mount from the machine, means on the support to stop the movement of the mount in predetermined positions, and means for separately adjusting the mount with respect to its position against each stop.

2. In a projector, a plurality of lenses of different focal length, a rotatable barrel on the machine for supporting said lenses, means for moving the barrel to aline the lenses separately with respect to the optical axis of the machine, and means permitting an additional alinement of each lens in the barrel with respect to the optical axis with which it is to be employed.

3. In a projector, a plurality of lenses of different focal length, a rotatable barrel on the machine for supporting said lenses, means for moving the barrel to aline the lenses separately with respect to the optical axis of the machine, means for separately focusing the lenses, and means permitting the additional alinement of each lens in the barrel with respect to the optical axis with which it is to be employed.

4. In a projector, a plurality of lenses of different focal length, a barrel for supporting said lenses, means supporting the barrel from the machine for movement around a fixed axis, means on the support to stop the barrel movement in predetermined positions thereof, means for moving the barrel to aline the lenses separately with respect to the optical axis of the machine, and means for separately focusing the lenses.

5. In a projector, a plurality of lenses of different focal length, a barrel supporting said lenses, means supporting the barrel from the machine, means on the support to stop the barrel movement in predetermined positions thereof, means for separately adjusting the barrel with respect to its position against each stop, means for moving the barrel to aline the lenses separately with respect to the optical axis of the machine, and means for separately focusing the lenses.

6. In a projector, a plurality of lenses of different focal length, a barrel supporting said lenses, means supporting said barrel from the machine, means for moving the barrel to aline the lenses separately with respect to the optical axis of the machine, means on the support to stop the barrel movement in predetermined positions, and means permitting the adjustment of each lens in the barrel to aline it with respect to the optical axis with which it is to be employed.

7. In a projector, a plurality of lenses of different focal length, a barrel supporting said lenses, means supporting said barrel from the machine, means for moving the barrel to aline the lenses separately with respect to the optical axis of the machine, means on the support to stop the barrel movement in predetermined positions, means to fasten the barrel in the changed position, means for separately adjusting the barrel with respect to its position against each stop, and means permitting the additional alinement of each lens in the barrel with respect to the optical axis with which it is to be employed.

8. In a projector, a rotatable lens-supporting barrel, having a plurality of lens-receiving passages therein, a gate plate spaced from the barrel, and having an aperture therein, a support for said barrel, means for moving the barrel to bring the passages therein into alinement with the aperture, means on the support to stop the barrel when the passages are so alined, and means for permitting the separate adjustment of the barrel with respect to each stop.

9. In a projector, a rotatable lens-supporting barrel, having a plurality of lens-receiving passages therein, a gate plate spaced from the barrel, and having an aperture therein, a support for said barrel, means for moving the barrel to bring the passages therein into alinement with the aperture, and telescopic means extending from the passages in the barrel, and bearing against the gate plate to form continuous closed passages for the light from the aperture through the barrel.

10. In a projector, a rotatable lens-supporting barrel, having a plurality of lens-receiving passages therein, a gate plate spaced from the barrel and having an aperture therein, means for moving the barrel to bring the passages therein into alinement with the aperture, a support for said barrel, means to stop the barrel when the passages are so alined, and telescopic means extending from the passages in the barrel and bearing against the gate plate to form continuous passages for the light from the aperture through the barrel.

11. In a projector, a rotatable lens-supporting barrel, having a plurality of lens-receiving passages therein, a gate plate spaced from the barrel and having an aperture therein, means for moving the barrel to bring the passages therein into alinement with the aperture, a support for said barrel, means on the support to stop the barrel when the passages are so alined, telescopic means extending from the passages in the barrel and bearing against the gate plate to form continuous passages for the light from the aperture through the barrel, and means for permitting the separate adjustment of the barrel with respect to each stop.

12. In a projector, a gate plate having an aperture therein, a rotatable lens-supporting barrel adjacent said plate, said barrel having passages therein, and telescopic tubes extending from the barrel toward the gate plate and forming extensions of the barrel passages, a plate connecting the ends of the tubes, and a curved bearing surface on the gate plate against which the connecting plate bears to reduce friction.

13. In a projector, a gate plate having an aperture therein, a rotatable lens-supporting barrel adjacent said plate, said barrel having passages therein, telescopic tubes extending from the barrel toward the gate plate and forming extensions of the barrel passages, a plate connecting the ends of the tubes, and means always urging the tubes toward the gate plate.

14. In a projector, a gate plate, having an aperture therein, a rotatable lens-supporting barrel adjacent said plate, said barrel having passages therein, telescopic tubes extending from the barrel toward the gate plate and forming extensions of the barrel passages, a plate connecting the ends of the tubes, a curved bearing surface on the gate plate against which the connecting plate bears to reduce friction, and means always urging the tubes toward the gate plate.

15. In a projector, a pair of spaced rings supported therefrom, a barrel rotatably supported within said rings, a pair of lenses supported on said barrel and spaced 180 degrees apart, said lenses having different focal lengths, an aperture opening with which the lenses are to be separately alined, and means on the rings to stop the barrel in predetermined positions of movement to aline said lenses.

16. In a projector, a pair of spaced rings supported therefrom, a barrel rotatably supported within said rings, a pair of lenses supported on said barrel and spaced 180 degrees apart, said lenses having different focal lengths, an aperture opening with which the lenses are to be separately alined, means on the rings to stop the barrel in predetermined positions of movement to aline said lenses, and set screws on the barrel to adjust the separate lenses with respect to the aperture opening.

17. In a projector, a rotatable member supporting a pair of lenses spaced 180 degrees apart thereon, a gate plate having an aperture therein and adjacent said member, said member provided with means forming closed passages extending from the lenses to said plate, and means maintaining said passages closed in any position of the member and during its movement to reduce fire hazard.

18. In a projector, a gate plate having an aperture therein, a turnable member adjacent said plate and having lens holding passages therein extending from the lenses to the plate, said passages spaced 180 degrees apart, lenses in said passages, means for moving said member in opposite directions, means to stop the member in each direction as the respective passages become alined with the aperture, and means for maintaining said passages closed in all positions of the member and during its movement.

19. In a projector, a gate plate having an aperture therein, a turnable member adjacent said plate and having lens holding passages therein extending from the lenses to the plate, said passages spaced 180 degrees apart, lenses in said passages, means for moving said member in opposite directions, means to stop the member in each direction as the respective passages become alined with the aperture, means for maintaining said passages closed in all positions of the member and during its movement, means for separately focusing each lens, and means for adjusting each lens separately with respect to the optical axis with which it is to be employed.

20. In a projector, a gate plate having an aperture therein, a turnable member adjacent said plate and having lens holding passages therein extending from the lenses to the plate, said passages spaced 180 degrees apart, lenses in said passages, means for moving said member in opposite directions, means to stop the member in each direction as the respective passages become alined with the aperture, means for maintaining said passages closed in all positions of the member and during its movement, means for separately focusing each lens, means for adjusting each lens separately with respect to the optical axis with which it is to be employed, and means for adjusting the member with respect to each stop means.

21. In a projector, a gate plate having an aperture therein, a turnable barrel adjacent said plate having a pair of passages extending therethrough, a lens adjustably disposed in one end of each passage, a telescopic light-enclosing member adjustably disposed in the opposite end of each passage and extending to and bearing against said plate, and forming a continuous light enclosing passage, means to maintain said passages closed at all times, said barrel having two extreme positions of movement, means to stop the barrel in these positions, said lenses in these positions of the barrel being respectively alined with the aperture, and means for separately adjusting the barrel in each position with respect to the optical axis through said aperture in that position of the barrel.

22. In a projector, a plurality of lenses of different focal length, a rotatable barrel on the machine, for supporting said lenses, means for moving the barrel to aline the lenses separately with respect to the optical axis of the machine, and eccentric means for mounting each lens in the barrel to permit additional alinement thereof with respect to the optical axis of the machine with which it is to be employed.

AUGUSTO DINA.